United States Patent [19]

Nelson

[11] Patent Number: 4,960,029

[45] Date of Patent: Oct. 2, 1990

[54] MUSICAL SCALE DETERMINING DEVICE

[76] Inventor: Michael B. Nelson, 7 Stephen Court, Nunawading Victoria 3131, Australia

[21] Appl. No.: 434,303

[22] Filed: Nov. 13, 1989

[51] Int. Cl.$^5$ ............................................. G09B 15/02
[52] U.S. Cl. .................... 84/473; 235/70 R; 235/89 R
[58] Field of Search .............. 84/473, 471 SR, 480, 84/485 SR; 235/70 R, 70 A, 70 B, 70 C, 89 R

[56] References Cited

U.S. PATENT DOCUMENTS

| | | | |
|---|---|---|---|
| 1,091,598 | 3/1914 | Somers | 84/473 |
| 1,236,339 | 8/1917 | Mills | 84/473 |
| 1,783,361 | 12/1930 | Gibson | 84/473 |
| 2,657,610 | 11/1953 | Carran | 84/473 |
| 2,832,252 | 4/1958 | Gabriel | 84/473 X |
| 3,592,099 | 7/1971 | Gibby | 84/473 |
| 3,791,254 | 2/1974 | Muller | 84/473 X |
| 4,677,893 | 7/1987 | Fahnestock | 84/473 |

FOREIGN PATENT DOCUMENTS

| | | | |
|---|---|---|---|
| 1181237 | 6/1959 | France | 84/473 |
| 1428750 | 3/1976 | United Kingdom | 84/473 |

*Primary Examiner*—Lawrence R. Franklin
*Attorney, Agent, or Firm*—Jack C. Munro

[57] ABSTRACT

A musical scale determining device which takes the form of a conventional slide rule configuration. The device includes a sheet material body. Upon both the front and back surface are printed conventional musical notes in specific arrangements. A cursor is movably mounted on the body with the cursor including a plurality of transparent windows through which are to be observed the conventional musical notes on both the front and back surfaces of the body. Movement of the cursor in various positions is to disclose to the user a wide variety of different types of musical scales.

3 Claims, 1 Drawing Sheet

U.S. Patent     Oct. 2, 1990     4,960,029
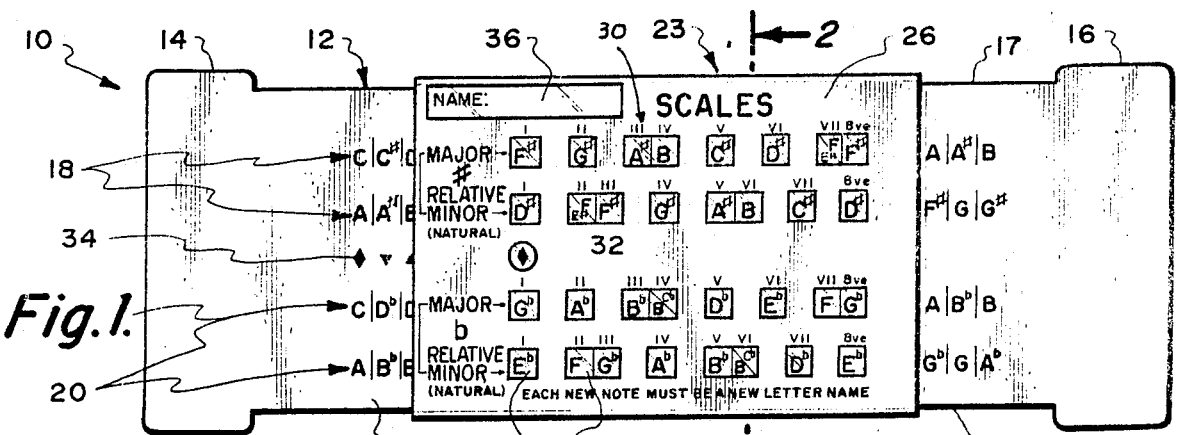
Fig. 1.
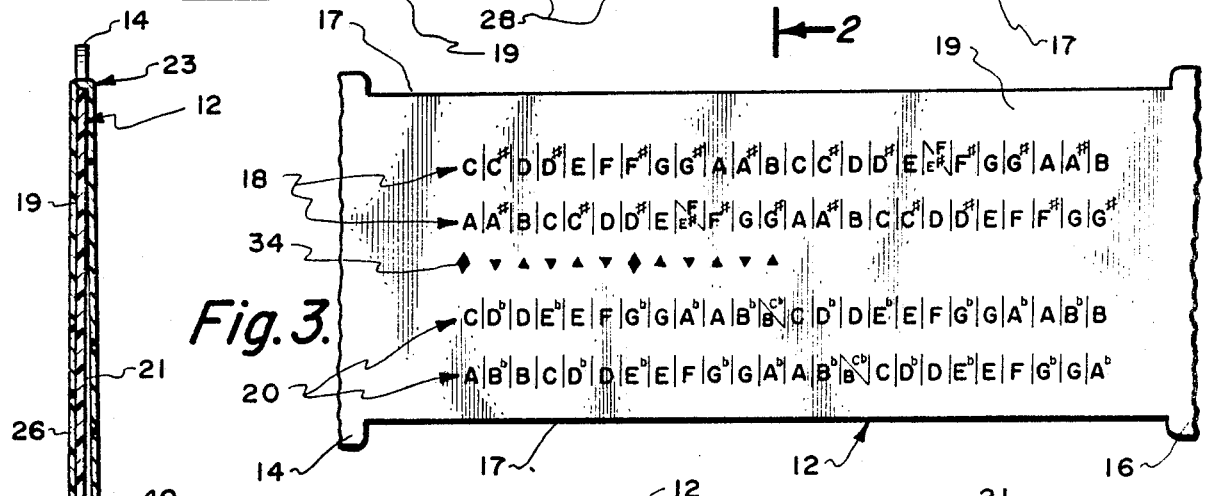
Fig. 2.
Fig. 3.
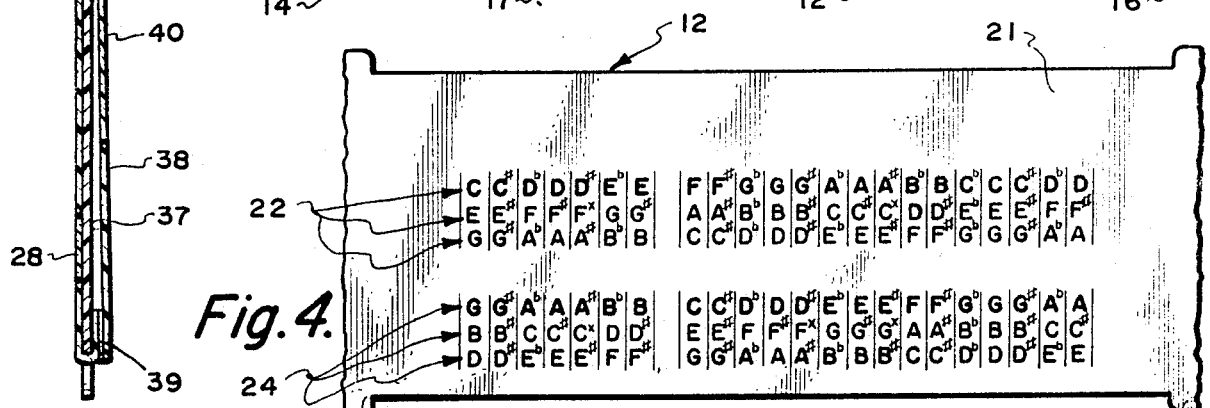
Fig. 4.
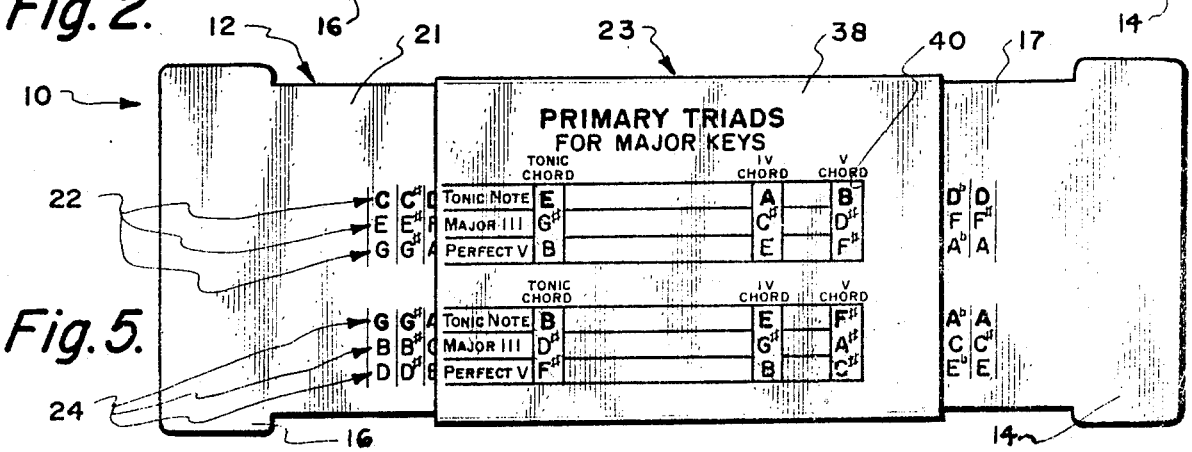
Fig. 5.

MUSICAL SCALE DETERMINING DEVICE

BACKGROUND OF THE INVENTION

The field of this invention relates to teaching aids and more particularly to a teaching aid to be of assistance to any student of music to facilitate the ascertaining of different musical scales.

Musical tones are sounds with a definite pitch or frequency. When these tones are tabulated systematically in ascending or descending order of pitch, a musical scale is created. There are a great many different number of scales. The integrals or leaps of pitch between successive notes vary from one scale to another.

Musical scales have a common foundation, that being an octave. The octave is the pitch span representing a doubling of frequency. It is a curiosity of the hearing of a human being that at each leap of one octave, the human being seems to hear the same note again of a higher or lower pitch, but nevertheless merging perfectly with the original note spaced an octave away.

An octave corresponds to a frequency ratio of two to one (2:1). Notes with the ratio of three to two (3:2) or four to three (4:3) also blend very pleasingly to form simple chords. The three ratios together provide a complete set of notes for the common pentatonic scale. This pentatonic scale is commonly used in the East and is also found in Western folk music.

Remembering scales, in terms of the frequency ratios, is difficult for most musicians. As a result, these pitch intervals are named in terms of their spacing on the staff. Thus, an interval of 3:2 occurs over a span of five possible note positions and is known as the perfect fifth. The integral of 4:3 covers four different positions and is a perfect fourth, while a ratio of 2:1 spans eight note positions and therefore is an eighth or an octave.

A scale which includes the note and the sharps of notes is defined as a major scale. A scale which includes the note and flats of the note is defined as a minor scale. Both the major and minor scales comprise eight different notes. Selecting different sequential notes of a major and a minor scale produces a major triad, a major third, and a minor third.

A major third, followed by a minor third, has a 4:5:6 frequency relationship and is known as the major triad (a triad is a group of three notes). A minor triad is the same as a major triad except when the middle note is moved down (flattened). Interlocking groups of such triads provide a complete framework through the two main diatonic scales. Diatonic means ranging through the eight conventional tones.

Music is defined in terms of a key. Another way of referring to the key is by way of the tonic note.

Within the major and minor diatonic scales there are smaller intervals. The larger of these intervals is called a whole tone and the smaller interval is referred to as a semitone. Semitone is approximately half the size of a whole tone.

It is not believed to be necessary to discuss in detail the main different types of scales that are in common use in music. However, the structure of this invention is not only to facilitate the determining of normal major and minor scales within an octave and the determining of a primary triads for major keys, the device of this invention can also be used to determine harmonic minor scales, melodic minor scales, pentatonic major and minor scales, dominant seventh scales, augmented scales, the Lydian augmented scale, diminished seventh scales, the three harmonic triads of a harmonic minor scale and determining of the common tetrachord between primary triads.

Previously, there have been attempts in designing teaching aids that will assist the music student in the determining of the different types of scales. However, these teaching aids generally take the form of some kind of a chart. To determine the wide variety of different types of scales, numerous charts had to be utilized therefore requiring several pages of written material. Also, these charts were known to be somewhat complicated and required in and of themselves time to educate the user on how to correctly use the chart.

SUMMARY OF THE INVENTION

The primary purpose of the structure of the present invention is to construct a teaching aid which can be easily and quickly learned by a music student which easily and quickly permits the students to ascertain the different musical scales.

Another objective of the present invention is to construct a teaching aid that is small in size, easy to read, can be readily carried on one's person, and can be used to determine any musical scale of a vast number of different types of musical scales.

The structure of this invention takes the form of a conventional slide rule in which there is a body which has a front surface and a back surface. On both the front and back surfaces are printed musical notes in specific arrangements. These notes in these specific arrangements by themselves are of very little value. However, to be associated with each series of notes is a cursor and this cursor is to be longitudinally movable on the body. The cursor is basically opaque but does have a plurality of specifically oriented transparent windows. The transparent windows associated with the front surface can be used to determine a wide number of different types of scales. The transparent windows located directly adjacent the back surface of the body is to be used for the purpose of determining the primary triads, or major keys. These primary triads are defined as the tonic note, the major third and the perfect fifth. These triads include the tonic chord, the fourth chord and the fifth chord.

BRIEF DESCRIPTION OF THE DRAWING

FIG. 1 is a front view of a musical scale determining device of this invention showing the relationship between the cursor and the body of the device:

FIG. 2 is a cross-sectional view taken along line 2—2 of FIG. 1;

FIG. 3 is a front view of just the body of the musical scale determining device of this invention with the cursor having been removed;

FIG. 4 is a view of the back side of just the body with the cursor having been removed; and FIG. 5 is a back view of the musical scale determining device of this invention with the cursor being mounted on the body.

DETAILED DESCRIPTION OF THE SHOWN EMBODIMENT

The musical scale determining device 10 of this invention is designed to assist both high and low level music students to provide a compact visible reference device to assist in the learning and understanding of different musical scales. The device 10 is a revolutionary low-cost aid for teaching both of music structure and note composition of music set to different keys.

The device 10 has a thin sheet material body 12 which is constructed of either paper or plastic or some other similar rigid material. This body 12 terminates at one end into a slightly enlarged section 14 and at the opposite end a slightly enlarged section 16. The portion of the body 12 that is located between the enlarged sections 14 and 16 defines a necked down section 17.

Printed on the front surface 19 of the body 12 are four in number of longitudinally oriented rows of musical notes. Two of the rows are located within an upper section 18 and two of the rows are located in a lower section 20. It is to be noted that there is the same number of musical notes within each row. The upper section 18 includes the sharps of musical notes. The lower section 20 includes flats of musical notes.

Located in between the upper section 18 and the lower section 20 and printed on the front surface 19 are a series of indicators 34. These indicators 34 comprise either a pointer that points in the downward direction toward the lower section 20 or a pointer that points in an upward direction toward the upper section 18. Also, there is utilized a double pointer that points both toward the upper section 18 and toward the lower section 20. The purpose of these indicators 34 will be explained further on in this specification.

Located on the back surface 21 of the body 12 are vertical rows of musical notes, again located in an upper section 22 and a lower section 24. The number of notes within the upper section 22 is equal to the number of notes within the lower section 24. The notes within the upper section 22 and the lower section 24 are located in columns of three notes each.

Formed within the back surface 38 of a cursor 23 are a series of transparent windows 40. Each window 40 is capable of observing a single column of three notes within either an upper section 22 or a lower section 24. It is to be noted that there are six in number of windows 40 with three windows 40 being located directly adjacent and capable of reading three columns of the musical notes within the upper section 22 and the remaining three windows 40 capable of observing three of the columns of musical notes within the lower section 24. This cursor 23 is slidable within the necked down section 17. The windows 40 are for the purpose of determining the primary triads for the major keys. Two of the windows 40 that are in transverse alignment are for the purpose of determining the tonic chord. Two of the other windows 40 are for the purpose of determing the fourth chord. The remaining two windows 40 determine the fifth chord. The uppermost note in each window 40 is called the tonic note. The middle note is called the major third, and the lowermost note is referred to as the perfect fifth.

These three primary triads are the three most important chords in any key. Together, these triads include all the notes that make up the scale of the tonic chord. The tonic note provides the letter name of the chord. In other words, shown in FIG. 5, the tonic chord within the upper section 22 is E, the fourth chord is A and the fifth chord is B. Within the lower section 24, the tonic chord is B, the fourth chord is E and the fifth chord is F# (F sharp). Comparing of the tonic chords between the vertically aligned pair of windows 40, it can be seen that the note B is duplicated. Therefore, the common tetrachord between the tonic chords of the upper section 22 and the lower section 24 is E, G#, E#, and F#. In a similar manner, the common tetrachord of fourth chords is A, C#, G#, B with the E note being duplicated. The common tetrachord of the fifth chord is B, D#, A#, C#. It is to be understood that the cursor 23 can be moved longitudinally along the upper section 22 and the lower section 24 thereby obtaining a vast number of different tonic chords, fourth chords and fifth chords.

To create the three primary triads of a harmonic minor scale, it is only necessary to lower the major third note in the tonic and subdominate (IV) chords. The dominate chord (V) remains as displayed. The major third note in that chord is actually a raised seventh.

Within the front surface 26 of the cursor 23 are located a plurality of windows 28. These windows 28 are located in four different rows with two of the rows connecting with the upper section 18 and the remaining two rows to connect with the lower section 20 of musical notes. Separating the rows of the upper section 18 from the lower section 20 is a circular window 32. Observable through the window 32 is an indicator 34.

Each window 28 has identifying indicia 30. This indicia 30 is either the Roman Numeral I, II, III, IV, V, VI, VII with the eighth window being defined as the 8ve. The windows 8ve refer to the octave. The uppermost row is to denote a major sharp scale with the remaining row that connects with the upper section 18 to define the relative sharp minor or natural scale. The rows that connect with the lower section 20 denote major flat scales with the bottommost row to denote the relative flat minor (or natural) scale. Therefore, when locating of the cursor 23 in the position shown in FIG. 1, the major sharp scale is the F# scale and the relative sharp minor scale is the D# scale. It is to be noted that the pointer 34 points toward the upper section 18 which indicates to the user that the information observed through the windows 28 is valid and accurate and can be utilized.

It is also to be noted that the pointer 34 points in the downward direction which indicates to the user that the information observed through the windows 28 in the lower section 20 can also be utilized. This means that the major flat scale is G♭ (G flat) and the relative flat minor scale is E♭.

If the cursor 23 is moved one position to the right of FIG. 1, it is to be noted that the indicator 34 points only in the upward direction. This means that only the sharp scales are accurate. If the user moves the cursor 23 one position to the left of the position shown in FIG. 1, it is noted that the pointer points only in the downward direction toward the lower section 20. This means that to the user that only the flat scales are accurate.

To create a harmonic minor scale, the user only need to raise the seventh note of the natural minor scale by one-half tone (semitone). To create a melodic minor scale, raise the sixth and seventh notes of the natural minor scale by a half-tone when ascending. Descend as a natural minor scale.

A pentatonic major scale can be created by removing the fourth and sixth notes from a major scale. The pentatonic minor scale can be created by removing the second and sixth notes from a natural minor scale. Dominant seventh scales can be created by lowering of the seventh note of a major scale by a half-tone. Augmented scales can be created by raising the fifth note of a major scale by a half-tone. For a Lydian augmented scale, raise the fourth note by a half-tone. The diminished seventh scales can be created by lowering the third and fifth notes of a major scale. This is based on a diminished triad.

It is to be noted that the cursor 23 is to remain continuously connected to the necked down area 17 and is not intended to be removed. The cursor 23 is formed of thin sheet material located enclosed forming internal chamber 37. The ends of the cursor 23 are fixed together by adhesive strip 39. The body 19 is located within internal chamber 37. Included within the front surface of the cursor 23 is a name indicating window 36. The purpose of this window 36 is for the user to place his or her name within that window if such an identification means is deemed to be desirable.

What is claimed is:

1. A musical scale determining device comprising:
    a thin sheet material body having a front surface and a back surface, said body having enlarged end sections with a necked-down section located therebetween;
    first indicia printed on said front surface, said first indicia denoting conventional musical note representations, said first indicia being arranged in a first specific arrangement, said first specific arrangement comprising a plurality of longitudinally oriented rows of musical notes divided into a first upper section and a first lower section, therebeing the same number of musical notes in both said first upper and first lower sections, said first upper section including the sharps of said musical notes and no flats, said first lower section including the flats of said musical notes and no sharps;
    a cursor movably mounted longitudinally on said necked-down section of said body, said cursor having limits of movement on said body defined by said enlarged end sections, said cursor being permanently attached to said body with disengagement not being possible under normal use of said device, said cursor including second indicia, said second indicia for denoting conventional musical scales, said scales to be visually observed from said first indicia when said cursor is positioned directly adjacent said first indicia, said cursor is locatable at various longitudinal positions relative to said first indicia and at each said position at least a single said musical scale is to be observable;
    third indicia printed on said back surface, said third indicia comprising conventional musical notes, said third indicia being arranged in a second specific arrangement, said second specific arrangement comprising a plurality of vertical rows of said musical notes divided into a second upper section and a second lower section, the number of said musical notes in said second upper section equals the number of said musical notes in said second lower section; and
    fourth indicia located on said cursor, said fourth indicia for ascertaining the primary triads for major keys of music with said primary triads to be selected from said third indicia, said fourth indicia is to be locatable at various longitudinal positions relative to said third indicia and at each said position at least a single said primary triad is to be observable.

2. The musical scale determining device as defined in claim 1 wherein;
    said second indicia including a plurality of transparent windows with said body being primarily opaque.

3. The musical scale determining device as defined in claim 2 wherein:
    said fourth indicia including a plurality of transparent windows with said cursor being primarily opaque.

* * * * *